United States Patent [19]

Chartier

[11] Patent Number: 4,815,092
[45] Date of Patent: Mar. 21, 1989

[54] LASER GENERATOR WITH ZEOLITIC CATALYST CARRIER AND METHOD OF MAKING SAME

[75] Inventor: Marc E. P. Chartier, Paris, France

[73] Assignee: Societe Anonyme de Telecommuncations, France

[21] Appl. No.: 129,528

[22] Filed: Dec. 7, 1987

Related U.S. Application Data

[63] Continuation of Ser. No. 801,043, Nov. 22, 1985, abandoned.

[30] Foreign Application Priority Data

Nov. 23, 1984 [FR] France ................................ 84 17886

[51] Int. Cl.⁴ ............................................. H01S 3/22
[52] U.S. Cl. ........................................ 372/59; 372/34; 372/61
[58] Field of Search ..................... 372/59, 60, 55, 34, 372/61; 313/553

[56] References Cited

U.S. PATENT DOCUMENTS 4,547,886 10/1985 Kaminski et al. ...................... 372/59
4,617,668 10/1986 Rudko et al. .......................... 372/59

OTHER PUBLICATIONS

C. Willis et al., "Sealed Tea CO2 Lasers with External Control of Gas Chemistry", Appl. Phsy. Letters, vol. 31, No. 2, (15 Jul. 1977), pp. 84–86.

Primary Examiner—William L. Sikes
Assistant Examiner—B. Randolph
Attorney, Agent, or Firm—Jacobs & Jacobs

[57] ABSTRACT

A laser generator with a catalyst for the laser gas is provided comprising a cavity which communicates with a housing receiving a catalytic cartridge, which communicates also with a laser gas reserve, and which is subjected to the action of the heat released by the laser effect. The cartridge contains, inside a mechanical filter, granules of zeolite on which a manganese dioxide catalyst has been fixed. The generator, whose output power is stabilized, has a long lifespan.

8 Claims, 1 Drawing Sheet

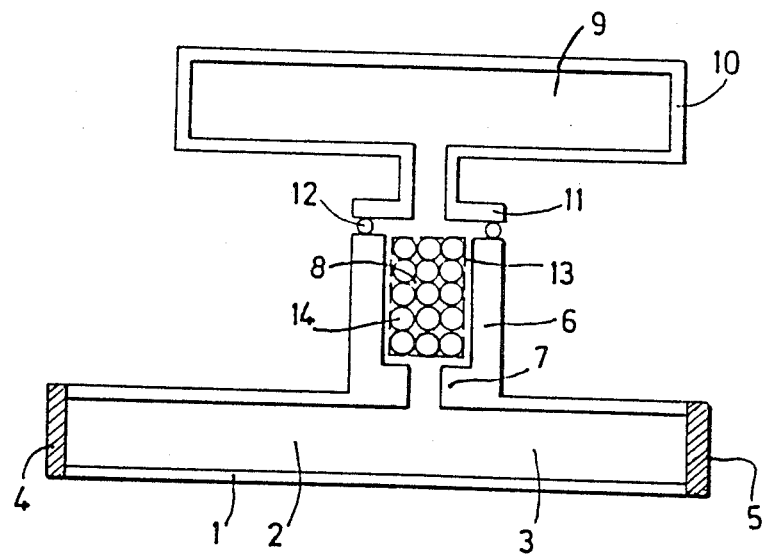

LASER GENERATOR WITH ZEOLITIC CATALYST CARRIER AND METHOD OF MAKING SAME

CROSS REFERENCE

This is a continuation of Ser. No. 801,043 filed Nov. 22, 1985, now abandoned.

BACKGROUND OF THE INVENTION

1. Field of the Invention

The present invention relates to a laser generator comprising a resonant cavity filled with a laser gas and electric pumping electrodes for causing a laser discharge in the gas of the cavity then subjected to a temperature rise.

Such a generator is used for example in medical or military fields.

2. Description of the Prior Art

Generators of this type have a major drawback which limits their lifespan, namely the degradation of the gas.

Degradation of the gas, generally $CO_2$, results in the following chemical reactions, caused directly by the high voltage discharge:

$$CO_2 \rightarrow CO + O$$

$$CO \rightarrow C + O$$

Such degradation of the gas may be prevented by using solid catalysts disposed in the cavity, which promote the reverse chemical reactions.

$$C + O \rightarrow CO$$

$$CO + O \rightarrow CO_2$$

But the solid catalysts known up to present, such for example as hopcalite, are powdery; despite very stringent precautions during use, they therefore pollute the laser.

Degradation of the gas may further be prevented by adopting an active cathode, having a certain catalytic and oxidizing power, formed form an appropriate mixture of metals and oxides, such for example as copper, nickel, cobalt. Although such an electrode effectively prevents degradation of the gas, it causes on the other hand appreciable pollution of the resonant cavity by deposition of metals and oxides on its internal wall, thus causing another form of degradation of the laser.

Finally, and even with known solid catalysts or an active electrode, the lifespan of the generator and its correct operation remain limited.

The applicant has then tackled this problem of degradation of the laser gas and pollution of the cavity.

As catalysis means perfectly appropriate for the reaction $$CO \rightarrow CO_2$$

the product known under the name of hopcalite is already known. It is a mixture of manganese dioxide and copper oxide. The manganese dioxide oxide plays an oxidizing role and the copper oxide a catalysis role.

In order to ensure the catalytic action, this material must have a particular structure, in the case in point a sponge structure.

Hopcalite is a friable material generator of dust prejudicial to the correct operation of the laser.

In any case, agglomerated grains of hopcalite bonded to a support, inside the laser cavity, do not produce any catalysis effect.

As for the solution of disposing grains of hopcalite inside a filter, it has the drawback that the filter forms, for the gases, an obstacle difficult to cross.

There further exist molecular cells with microporous structure, known under the name of zeolites. These are natural or artificial alumino-silicates. They have been used up to present as vacuum agents, because of their characteristic of retaining in their micropores very large amounts of gas and more especially heavy gases, such as precisely, carbon dioxide gas $CO_2$.

After studying the reasons for this quality of zeolites, the applicant had the idea of using them in laser generators as supports for catalysts of the hopcalite type, despite the fact that their gas retention property has been up to now considered a disadvantage for lasers.

The document EP-A-No. 0 081 081 teaches, for a laser generator, to dispose a catalyst supporting layer in a chamber separated from the laser cavity itself. But this supporting layer extends relatively far from the laser cavity, so that it is necessary to provide means for heating the catalyst, which is a disadvantage.

SUMMARY OF THE INVENTION

The present invention provides then a laser generator of the above mentioned type, in which the catalyst is received on a support disposed in a part of the generator communicating with the cavity, the catalyst containing manganese dioxide formed directly, on a zeolitic support, first of all by dipping the support in a first bath of potassium permanganate dissolved in water and in a second bath of metal sulfate dissolved in water, then by decomposition of the potassium permanganate in an acetone vapor atmosphere, and the zeolitic support is disposed in a hot part of the generator communicating, on the one hand, with the cavity and, on the other, with a laser gas reserve.

The catalyst of the generator of the invention has great cohesion and, because of that, it may be disposed very close to the laser cavity, even between this cavity and the gas reserve, which avoids having to heat it.

The zeolitic support retains the product of the permanent catalysis reaction, in this case $CO_2$ if the active medium of the laser is formed by a mixture comprising carbon dioxide gas, and frees it under the action of the heat. In fact, absorption and release of the carbon dioxide gas take place concomitently and permanently during operation of the generator. It is by capillary action that the gas is retained in the micropores of the zeolitic support and, when the temperature rises, this gas capillary action decreases because of the increase in the fluidity of the gas, which causes release thereof. The support for the catalyst of the invention acts then as a gas reservoir which is filled under the action of the increase in gas pressure in the laser cavity, and that of the laser effect and of the catalysis reaction, and which empties into the laser cavity under the action of the heat.

This release of gas, which increases the gain of the laser, offsets the loss of gain due to the temperature rise.

What is remarkable in the use of the zeolitic support of the invention, is that it plays a role the opposite of what is played up to present, when it was used only for filling and not for emptying.

BRIEF DESCRIPTION OF THE DRAWINGS

The invention will be better understood from the following description of the preferred embodiment of the generator of the invention, with reference to the single accompanying FIGURE which shows a schematical sectional view of the generator.

DESCRIPTION OF THE PREFERRED EMBODIMENT

The laser generator shown in the FIGURE comprises an outer housing 1 defining inside a duct 2 which, associated with two mirrors 4 and 5, forms a resonant cavity 3.

This cavity is filled with a gas medium which, in the case in point, is formed by carbon dioxide gas $CO_2$ in fact mixed with other gases, for example CO, nitrogen, and helium.

The generator uses electric pumping and therefore comprises, not shown, a power supply source and two electrodes. They may be electrodes extending into duct 2, in the vicinity of the two mirrors 4, 5 and between which is created an electric discharge, or a thread like electrode for one and a strip electrode for the other extending over the length and on each side of the duct 2, respectively. Electric pumping is advantageously provided at a high DC voltage, but could also be effected at radio frequency.

It will be noted that the invention in fact supplies to a generator with any duct, capillary or not, and that it is not limited to a gas medium comprising $CO_2$. Generally, the invention applies to a generator having a materially defined and heating cavity.

Housing 1 is adapted to define an extension 6, here in the form of a cylindrical sleeve with an axis perpendicular to that of the resonant cavity 3 which, in operation, also forms a hot part of the generator.

Sleeve 6 is connected to the rest of housing 1 by an annular shoulder 7, serving as support for a catalytic cartridge 8.

Through the sleeve 6, serving then as housing receiving cartridge 8, cavity 3 communicates with a reserve of the gas medium 9, inside an enclosure 10 connected to sleeve 6 by an annular shoulder 11, with interpositioning of an indium seal 12, and by means of conventional clamping means, not shown.

The catalytic cartridge 8, comprises a perforated or latticed case 13, serving as mechanical filter and containing zeolite granules 14 on which a catalyst has been previously fixed, in the way described below.

Starting with a commercial zeolite, which is very water absorbent, it is heated for drying it. Then it is dipped in a first bath obtained by dissolving potassium permanganate in water and it is again dried. Then it is dipped in a second bath obtained by dissolving copper sulfate in water, and it is again dried.

The zeolite granules are finally placed in an acetone vapor atmosphere, which decomposes the potassium permanganate and the copper sulfate, so as to form manganese dioxide and copper oxide which are to provide the oxidization function and the catalysis function, respectively.

Then rinsing is carried out. Before use, the catalyst thus obtained will have to be activated by heating to about 200° C. in a dry air stream.

It should be noted here that silver or cobalt, for example, may replace the copper (hopcalite) and that even several of these metals could be associated together for providing the catalysis function.

From the functional point of view, the catalyst transforms the carbon monoxide produced by the laser effect into carbon dioxide gas $CO_2$, and the micropores of the zeolite granules retain the carbon dioxide gas for releasing it under the action of the heat.

Under the operating conditions of the laser, the following steps occur:

under the action of the laser effect, the cavity heats up and the $CO_2$ is transformed into CO.

the catalyst incorporated in the zeolite granules transforms the CO into $CO_2$ which is retained in the granules;

the zeolite granules, under the action of the heat, release the $CO_2$ and the $CO_2$ pressure in the cavity increases.

It will be noted that maintenance of the $CO_2$ pressure in the cavity at a high level results from the catalytic action. In the absence of catalyst, a natural $CO/CO_2$ balance would be created with an inappropriate proportion of $CO_2$ and in any case smaller than in the presence of the catalyst.

The advantages of the above described invention are numerous.

It brings into play a clean catalyst, because of the mechanically stronger structure of the support used.

In the case of a $CO_2$ laser, the one which was considered above, the catalysis action is associated with an absorption-desorption action due, on the one hand, to the selectivity of the absorption of the zeolite, preponderant for $CO_2$ and, on the other hand, to the reduction of the capillarity effect on the zeolite at high temperatures.

Since the gain of a laser drops with the temperature, the hot $CO_2$ desorption stabilizes its output power and ensures correct operation when hot, while extending the lifespan thereof. Of course, the balance of the gain will depend on the microporosity of the zeolite and on the amount of catalyst material incorporated in the zeolite, which will therefore have to be experimentally but easily determined as a consequence.

Finally, it follows from the use of zeolite as a catalyst support that there is no longer need of the device for cooling the laser which is normally indispensable.

What is claimed is:

1. An arrangement for increasing the working lifetime of a gas laser, comprising:
   (a) laser means for generating an output laser beam during laser discharge of a lasing gas medium contained in a resonant cavity of a main elongated housing with attendant heating of said gas medium and with degradation of said gas medium into gaseous degradants;
   (b) a catalyst for converting said gaseous degradants to a reconverted gas medium during laser discharge;
   (c) carrier means including a microporous zeolitic support for supporting said catalyst thereon, said microporous porous zeolitic support having gas reservoir pores for adsorbingly retaining said reconverted gas medium produced by said catalyst, and for releasing said reconverted gas medium retained in said pores when exposed to heat; and
   (d) means for positioning said zeolitic support and said catalyst thereon in an elongated casing which extends transversely away from said main housing and in thermal proximity with said resonant cavity and in thermal communication with said gas medium therein such that said zeolitic support and said catalyst are heated by said gas medium during laser discharge, thereby releasing said reconverted gas medium retained in said pores of said microporous support.

2. The arrangement as recited in claim 1, wherein said casing extends perpendicularly to said main elongated housing.

3. The arrangement as recited in claim 1, wherein said casing is a tubular sleeve having constantly open opposite ends, one of which opens into said main elongated housing; and wherein said laser means includes a gas reserve enclosure which opens into said other end of said sleeve.

4. The arrangement as recited in claim 3, wherein said positioning means includes a perforated cartridge having an interior in which said support and said catalyst means are contained, said cartridge being mounted within said tubular sleeve intermediate said opposite ends thereof.

5. The arrangement as recited in claim 4, wherein said positioning means includes an annular shoulder within said sleeve and having a support surface on which said cartridge is seated.

6. The arrangement as recited in claim 1, wherein said lasing gas medium is carbon dioxide gas.

7. The arrangement as recited in claim 1, wherein said catalyst includes at least one oxide selected from the group of copper, nickel, silver and cobalt oxides.

8. The arrangement as recited in claim 1, wherein said catalyst is activated copper oxide and manganese dioxide.

* * * * *